United States Patent [19]

McDevitt

[11] Patent Number: 4,761,989
[45] Date of Patent: Aug. 9, 1988

[54] METHOD OF CALIBRATING A TORQUE TESTING DEVICE AND A MAGNETIC CALIBRATION DEVICE THEREFOR

[76] Inventor: Thomas M. McDevitt, 4009 Beechway Blvd., Toledo, Ohio 43614

[21] Appl. No.: 4,887

[22] Filed: Jan. 20, 1987

[51] Int. Cl.⁴ .................. G01L 25/00; H02K 49/10
[52] U.S. Cl. ...................... 73/1 C; 81/473; 310/103
[58] Field of Search ............ 73/1 C, 862.08, 862.17; 81/473; 310/103

[56] References Cited

U.S. PATENT DOCUMENTS

| 2,603,678 | 7/1952 | Helmer | 310/103 |
| 2,618,186 | 11/1952 | Mayer | 81/473 |
| 2,722,617 | 11/1955 | Cluwen et al. | 310/103 |

FOREIGN PATENT DOCUMENTS 2431057  1/1975  Fed. Rep. of Germany ........ 81/473

Primary Examiner—Charles A. Ruehl
Attorney, Agent, or Firm—Thomas A. Meehan

[57] ABSTRACT

A hand operable calibration device for calibrating or re-calibrating a spring type torque tester, the device having first and second partially overlapping members with bearings therebetween to permit relative rotation between the first and second members. The first and second members are provided, respectively, with first and second annular permanent magnets which are spaced apart and which overlap one another to create a magnetic drag of reproducible magnitude against the relative rotation between the first and second members. One of the members is grasped by the jaws of the torque tester that is being calibrated or re-calibrated, a torque is applied to the other member to overcome the magnetic drag against the relative rotation between the members and the level of torque needed to cause relative rotation between the first and second members is compared to the torque reading indicated by the torque tester at the time such relative rotation begins. A third member can be provided to permit selective adjustment in the degree of overlap between the first and second annular permanent magnets to permit the calibration or re-calibration of the torque tester at different torque levels.

13 Claims, 2 Drawing Sheets

METHOD OF CALIBRATING A TORQUE TESTING DEVICE AND A MAGNETIC CALIBRATION DEVICE THEREFOR

BACKGROUND OF THE INVENTION

1. Field Of The Invention

This invention relates to a device that is useful in applying a predetermined amount of torque and to a method of calibrating a torque testing device using such a torque applying device.

2. Description Of The Prior Art

Devices for testing torque are in widespread use in the packaging industry for testing the torque required to remove closures from glass or plastic bottles or to apply closures to glass or plastic bottles to a predetermined level of tightness. Torque testing devices using a spring type torque measuring element, known as Spring Torque Testers, have been commercially available for many years from Owens-Illinois, Inc. of Toledo, Ohio and are now commercially available from Secure Pak, Inc. of Toledo, Ohio.

For various reasons, spring type torque testers as described above must be periodically re-calibrated to ensure the necessary degree of accuracy for their continuing use, even in the controlled conditions of an industrial laboratory. For example, in the packaging of pharmacuetical products, there are Food and Drug Administration Regulations which require periodic re-calibration of torque testing devices. Heretofore, the procedure for re-calibrating a spring type torque tester was cumbersome and expensive, involving a special set-up and calibrated dead weights and almost always requiring that the spring type torque tester be shipped by the user to the manufacturer or to an otherwise qualified organization for such re-calibration, followed by the return shipment to the user, often involving a lengthy time period during which the torque tester was not available for use.

SUMMARY OF THE PRESENT INVENTION

According to the present invention there is provided a hand operable calibration device for applying a predetermined amount of torque to a torque testing device for the purpose of calibrating or re-calibrating the torque testing device. The calibration device according to the present invention, which is operable both in a clockwise and in a counterclockwise direction to permit the calibration or re-calibration of the torque testing device both for closure application and for closure removal, incorporates first and second axially aligned tubular members which are rotatable with respect to one another, one of the members having a portion which is positioned within a portion of the other. The overlapping portions of the first and second tubular members are provided with first and second annular permanent magnetic elements, respectively, the first and second permanent magnetic elements being radially spaced apart and being at least partially overlapping in a direction extending parallel to the aligned axes of the tubular members. The positional relationship between the first and second annular permanent magnetic elements creates a drag against rotation of the first and second tubular member with respect to one another, and for any given degree of overlap of the first and second annular permanent magnetic elements, any given spacing between the first and second annular permanent magnetic elements, and any given configuration of first and second tubular members, an accurately reproducible torque will be required to overcome the drag against the rotation of one of the first and second tubular members, as a result of a torque applied to such tubular member, when the other member is restrained against rotation. Because this torque is accurately reproducible, and will be accurately reproducible over an indefinite period of time unless the calibration device is dropped or otherwise damaged by abusive handling, the calibration device may be used to impart a precisely determined amount of torque to the torque tester for use in the calibration or the re-calibration of such torque tester, or in simply verifying that the torque tester is still operating within acceptable limits. Further, the amount of torque that is imposed on the torque tester by the calibration device according to the present invention can be varied by providing a third tubular element which is threadably interengaged with one of the first and second tubular elements to permit adjustment in the degree of overlap between the first and second annular permanent magnetic elements, since the drag against rotation of one of the first and second tubular members when the other of such tubular member is restrained against rotation that results from the overlapping of the radially spaced apart first and second annular permanent magnetic elements varies, as a linear function within the normal operating limits of a torque tester, based on the extent of such overlap. Thus, by providing externally visible markings on the calibration device according to the present invention which are indicative of the extent of overlap between the first and second annular permanent magnetic elements of such calibration device, the calibration device can be used to calibrate, re-calibrate or test the accuracy of a torque tester at multiple levels of torque. This can be very important in connection with certain torque testers which are used for multiple torque testing applications, for example, in a food packaging plant that packages various types of food products in containers having various sizes and types of closures. Preferably, a locking arrangement is provided to selectively lock the third tubular element in any desired position with respect to the one of the first and second tubular elements with which it is threadably interengaged, to prevent inadvertent changing in the extent of overlap between the first and second annular permanent magnetic elements. Preferably also, one of the first and second annular permanent magnetic elements is a continuous annular magnetic element, and the other of the first and second annular permanent magnetic elements is made up an annular series of spaced apart discrete magnetic elements, such discrete permanent magnetic elements being bonded to one of the first and second tubular members by an epoxy adhesive which prevents relative motion between such discrete magnetic elements.

Accordingly, it is an object of the present invention to provide a calibration device that is useful in calibrating or re-calibrating a torque testing device. It is a further object of the present invention to provide an improved method for calibrating or re-calibrating a torque testing device. More particularly, it an object of the present invention to provide a hand operable device for calibrating or re-calibrating a torque testing device, which hand operable device establishes an accurately reproducible drag against rotation between first and second tubular elements thereof. Even more particularly, it is an object of the present invention to provide a hand operable device of the aforesaid character in which the accurately reproducible drag is established by radially spaced apart and axially overlapping annular permanent magnetic elements. For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figures 1, 2:
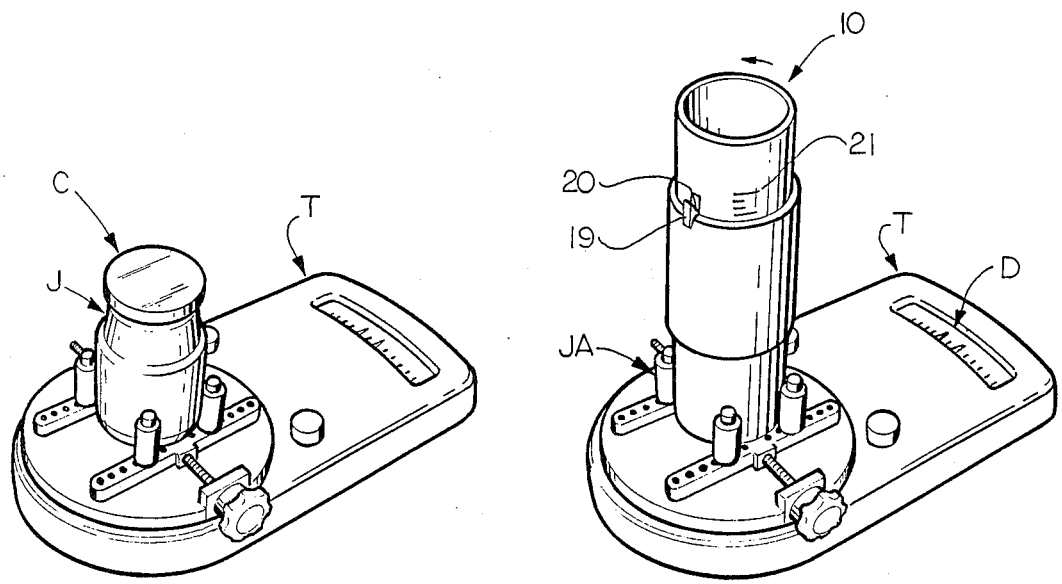
FIG. 1 is a perspective view showing a torque testing device according to the prior art having a container positioned therein in position for the testing of the torque needed to remove a closure from such container.
FIG. 2 is a perspective view showing the torque testing device of FIG. 1 with a calibrating device according to the preferred embodiment of the present invention positioned in such device for the purpose of calibrating, re-calibrating or checking the accuracy of such torque testing device.

FIG. 1 illustrates a typical spring type torque tester, identified generally by reference character T, of a type which has heretofor been extensively sold by Owens-Illinois, Inc, of Toledo, Ohio and which is now being sold by Secure Pak, Inc. of Toledo, Ohio. The torque tester T, in FIG. 1, is shown as having a jar J positioned therein, in readiness for a test to determine the amount of torque needed to remove a closure C from the jar J. A calibration device according to the preferred embodiment of the present invention is identified generally by reference numeral 10, and, in FIG. 2, the calibration device 10 is shown in position with respect to the torque tester T for purposes of calibrating or re-calibrating the torque tester T, or otherwise determing the accuracy of the torque tester T, the calibration or re-calibration of the torque tester T being accomplished by securely engaging one end of the calibration device 10 in a set of jaws JA of the torque tester and by applying a torque to the other end of the calibration device 10 until the other end slips, rotationally, with respect to the end that is engaged in the jaws JA.

Figure 4:
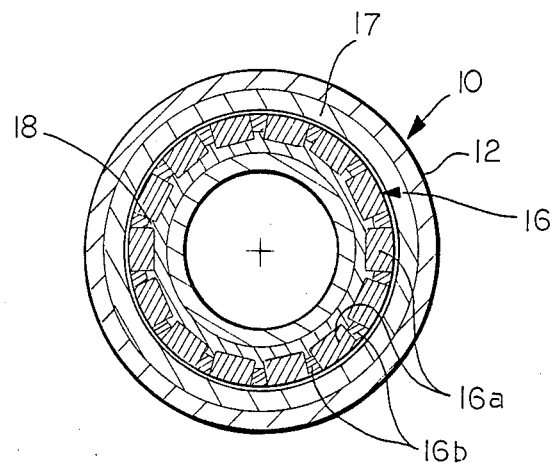
FIG. 4 is a sectional view taken on line 4—4 of FIG. 3.
Figure 3:
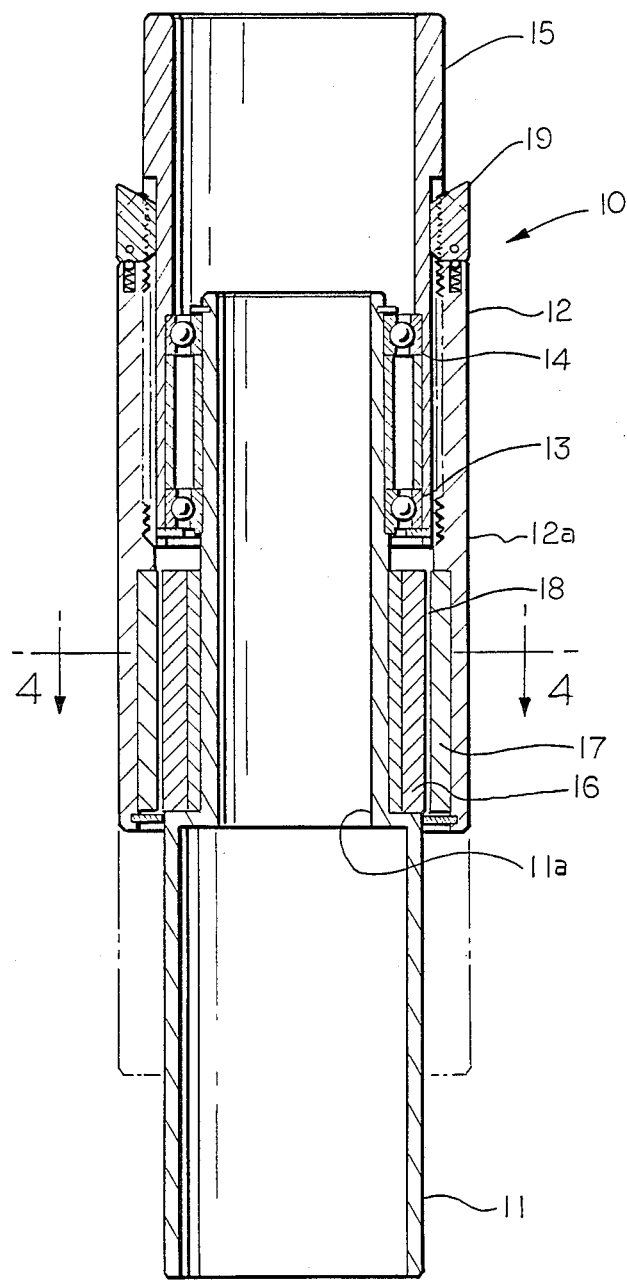
FIG. 3 is a sectional view at an enlarged scale of the calibrating device illustrated in FIG. 2, taken along the longitudinal central axis thereof.

As is shown most clearly in FIGS. 3 and 4, the calibrating device 10 is made up of first and second axially aligned tubular members 11 and 12, respectively. The first and second tubular members 11 and 12 are rotatable with respect to one another, bearings 13 and 14 being positioned between the outside of the first tubular member 11 and the inside of a third tubular member 15 which is axially aligned with the first and second tubular members 11 and 12 and which is threadably received within the second tubular member 12, for purposes which will be hereinafter explained more fully.

The first tubular member 11 has an inwardly stepped portion 11a which is positioned co-axially within an end 12a of the second tubular member 12, to provide for a significant, and, preferably, for reasons which will be hereinafter explained more fully, adjustable, degree of overlap between the first tubular member 11 and the second tubular member 12.

The outside of the stepped portion 11a of the first tubular member 11 is provided with first annular permanent magnetic means 16 secured thereto, the first annular permanent magnetic means 16, as is shown in FIG. 4, preferably comprising a circumferential series of spaced apart individual permanent magnetic elements 16a which are spaced apart and held in place by a cured epoxy adhesive 16b. Similarly, the inside of the end portion 12a of the second tubular member 12 is provided with second annular permanent magnetic means 17 in the form of a continuous ring which is secured thereto, as by a press fit, to at least partially surround the first annular magnetic means 16 with a radial space 18 therebetween.

By virtue of the overlapping of the radially spaced apart portions of the first annular magnetic means 16 and the second annular magnetic means 17, a magnetic drag will be imposed that will resist the relative rotation of the first tubular member 11 and the second tubular member 12 with respect to one another. This magnetic drag, by virtue of the permanent magnetic characteristics of the first annular magnetic means 16 and the second annular magnetic means 17, is accurately reproducible, within the degree of accuracy needed to permit the use of the calibration device 10 in the calibration of the torque tester T, for example, within a degree of accuracy of ± four percent (4%), over a torque range of 0-150 in-lb., so that, by positioning the end of the first tubular member 11 in the torque tester T, as is shown in FIG. 2, and by grasping the end of the third tubular member 15 to turn it with respect to the end of the first tubular member 11, an accurately reproducible level of torque will be imposed on the torque tester T through the jaws JA for comparison with the torque reading observed or recorded in a dial portion D of the torque tester T at the time when the torque imposed on the third tubular member 15 is sufficient to cause it to overcome the magnetic drag against its rotation with respect to the first tubular member 11. In the manufacture of a calibration device 10 of the type described herein, "Histalloy" brand permanent magnetic elements have found to be quite suitable for use as the magnetic elements 16a of the first annular magnetic means 16 and as the second annular magnetic means 17.

For any given amount of axial overlap between the first annular magnetic means 16 and the second annular magnetic means 17, a predetermined level of torque will be imposed on the torque tester T by the rotation of the third tubular member 15 with respect to the second tubular member 12 of the calibration device 10. While many torque testing applications can be performed satisfactorily by a torque tester T which is calibrated at only a single level of torque, many other applications require that the torque tester T be calibrated at multiple levels of torque, for example, in food packaging operations where the torque tester T is used to test the application or removal torques of different sizes and types of jars J with different sizes and types of closures C. Thus, in the preferred embodiment of the present invention, the calibration device 10 provides for selective and controlled variation in the degree of axial overlap between the first annular magnetic means 16 and the second annular magnetic means 17. By adjusting the degree of axial overlap between the first annular magnetic means 16 and the second annular magnetic means 17, the amount of torque that is imposed on the torque tester T by the relative rotation of the third tubular member 15 with respect to the first tubular member 11 can be caused to vary as a linear function of the degree of overlap between the first annular magnetic means 16 and the second annular magnetic means 17, at least within the normal operating range of the calibration device 10. Consequently, by virtue of the fact that the third tubular member 15 is threadably engaged within the second tubular member 12, by turning the third tubular member 15 within the second tubular member 12, the first tubular member 11, which is axially fixed with respect to the third tubular member 15, can be caused to move up and down with respect to the second tubular member 12, from the full overlap position illustrated in solid line in FIG. 3, to a minimum overlap position indicated in dotted line in FIG. 3. Once the desired degree of overlap between the second annular magnetic means 17 and the first annular magnetic means 16 has been achieved, further threadable rotation of the third tubular member 15 within the second tubular member 12 may be prevented by tabs 19 which are foldably attached to the second tubular member 12 and which engage axially extending slots 20 and the outside of the second tubular member 12. If desired, graduation markings 21, in the desired in. lb. torque readings, may be provided on the outside of the third tubular member 15 for alignment with the top of the second tubular member 12 to facilitate the adjustment in the level of torque to be imposed by the calibration device 10 on the torque tester T by the turning of the third tubular member 15 with respect to the second tubular member 12.

Although the best mode contemplated by the inventor for carrying out the present invention as of filing date hereof has been shown and described herein, it will be apparent to those skilled in the art that suitable modifications, variations and equivalents may be made without departing from the scope of the invention, such scope being limited solely by the terms of the following claims.

What is claimed is:

1. A device for applying a predetermined amount of torque comprising, in combination:
    a first member having an inside surface;
    a second member having an outside surface, at least a portion of said outside surface of second member being positioned to be surrounded by at least a portion of said inside surface of said first member;
    bearing means positioned between said at least a portion of said outside surface of said second member and said at least a portion of said inside surface of said first member, whereby said first member and said second member can be rotated relative to one another;
    first annular permanent magnetic means carried by said at least a portion of said first member;
    second annular permanent magnetic means carried by said at least a portion of said second member, at least a portion of said first annular permanent magnetic means surrounding at least a portion of said second annular permanent magnetic means, said at least a portion of said second annular permanent magnetic means being spaced apart from said at least a portion of said first annular permanent magnetic means, whereby said first annular permanent magnetic means and said second annular permanent magnetic means cooperate to impose a magnetic drag of a reproducible magnitude that resists the rotation of said second member and said first member with respect to one another, one of said first annular permanent magnetic means and said second annular permanent magnetic means comprising an annular series of circumferentially spaced apart discrete permanent magnetic elements; and
    cured epoxy adhesive means separating said discrete permanent magnetic elements from one another and bonding said discrete permanent magnetic elements to one another in said one of said first annular permanent magnetic means and said second annular permanent magnetic means.

2. A device according to claim 1 wherein the other of said first annular permanent magnetic means and said second annular permanent magnetic means comprises a unitary annular permanent magnetic element.

3. A device according to claim 2 wherein said one of said first annular permanent magnetic means and said second annular permanent magnetic means is said second annular permanent magnetic means.

4. A device according to claim 1 wherein said second member is an annular member.

5. A device for applying a predetermined amount of torque comprising, in combination:
    a first member having an inside surface and a longitudinal axis, said inside surface having a first portion and a second portion, said second portion being spaced from said first portion along said longitudinal axis;
    a second member having an outside surface and a longitudinal axis, said longitudinal axis of said second member being coaxial with said longitudinal axis of said first member, at least a portion of said outside surface of said second member being positioned to be surrounded by at least a portion of one of said first portion and said second portion of said inside surface of said first member;
    a third member having an inside surface, an outside surface and a longitudinal axis, said longitudinal axis of said third member being coaxial with said longitudinal axis of said first member, said third member being positioned with respect to said first member and said second member such that at least a portion of said outside surface of said third member is surrounded by at least a portion of the other of said first portion and said second portion of said inside surface of said first member and at least a portion of said inside surface of said third member surrounds at least a portion of said at least a portion of said outside surface of said second member;
    bearing means positioned between said at least a portion of said outside surface of said second member and said at least a portion of said inside surface of said third member whereby said second member and said third member can be rotated relative to one another, said second member and said third member being fixed against displacement relative to one another in a direction parallel to said longitudinal axis of said second member;
    first annular permanent magnetic means carried by said one of said first portion and said second portion of said inside surface of said first member;
    securing means non-rotatably securing said at least a portion of said outside surface of said third member to at least a portion of the other of said first portion and said second portion of said inside surface of said first member; and
    second annular permanent magnetic means carried by said at least a portion of said outside surface of said second member, at least a portion of said first annular permanent magnetic means surrounding at least a portion of said second annular permanent magnetic means by an overlap distance that extends parallel to said longitudinal axis of said first member, said at least a portion of said second annular permanent magnetic means being spaced apart from said at least a portion of said first annular permanent magnetic means, whereby said first annular magnetic means and said second annular magnetic means cooperate to impose a magnetic drag of reproducible magnitude that resists the rotation of said second member upon the rotation of any of said first member and third member.

6. A device according to claim 5 wherein said securing means comprises means for selectively changing the position of said first member and said third member with respect to one another in a direction that extends parallel to said longitudinal axis of said second member, whereby to change said overlap distance between said at least a portion of said first annular permanent magnetic means and said at least a portion of said second annular permanent magnetic means and to thereby change the reproducible magnitude of said magnetic drag.

7. A device according to claim 6 wherein said securing means comprises;
first screw thread means on said at least a portion of said other of said first portion and said second portion of said inside surface of said first member;
second screw thread means on said at least a portion of said outside surface of said third member, said second screw thread means being threadably received in said first screw thread means; and
selective locking means for selectively locking said second screw thread means against threadable rotation within said first screw thread means or for permitting said second screw thread means to be threadably rotated within said first screw thread means.

8. A device according to claim 5 wherein one of said first annular permanent magnetic means and said second annular permanent magnetic means comprises an annular series of circumferentially spaced apart discrete permanent magnetic elements.

9. A device according to claim 8 wherein the other of said first annular permanent magnetic means and said second annular permanent magnetic means comprises a unitary annular permanent magnetic element.

10. A device according to claim 9 wherein said one of said first annular permanent magnetic means and said second annular permanent magnetic means is said second annular magnetic means.

11. A device according to claim 8 and further comprising cured epoxy adhesive means separating said discrete permanent magnetic elements from one another and bonding said discrete permanent magnetic elements to one another in said one of said first annular permanent magnetic means and said second annular permanent magnetic means.

12. A method of calibrating a torque testing device having a set of jaws, said method comprising the steps of:
providing a calibrating device for applying a predetermined amount of torque, said calibrating device comprising, in combination; a first member having an inside surface; a second member having an outside surface, at least a portion of said outside surface of second member being positioned to be surrounded by at least a portion of said inside surface of said first member; bearing means positioned between said at least a portion of said outside surface of said second member and said at least a portion of said inside surface of said first member, whereby said first member and said second member can be rotated relative to one another; first annular permanent magnetic means carried by said at least a portion of said first member; and second annular permanent magnetic means carried by said at least a portion of said second member, at least a portion of said first annular permanent magnetic means surrounding at least a portion of said second annular permanent magnetic means, said at least a portion of said second annular permanent magnetic means being spaced apart from said at least a portion of said first annular permanent magnetic means whereby said first annular permanent magnetic means and said second annular permanent magnetic means cooperate to impose a magnetic drag of a reproducible magnitude that resists the rotation of said second member and said first member with respect to one another;
securely engaging one of said first member and said second member of said calibrating device in said jaws of said torque testing device; and
applying sufficient torque to the other of said first member and said second member of said calibrating device to overcome said magnetic drag that resists the rotation of said second member and said first member with respect to one another.

13. The method of claim 12 wherein said torque testing device comprises a torque indicator and means to cause said indicator to indicate the amount of torque that is imposed on said set of jaws, and further comprising the step of comparing the torque indicated by said indicator with the torque to overcome said magnetic drag of reproducible magnitude that resists the rotation of said second member and said first member with respect to one another.

* * * * *